United States Patent
Ha

(10) Patent No.: US 9,013,072 B2
(45) Date of Patent: Apr. 21, 2015

(54) INTERNAL VOLTAGE GENERATOR AND OPERATION METHOD THEREOF

(75) Inventor: Joo-Yun Ha, Gyeonggi-do (KR)

(73) Assignee: Hynix Semiconductor Inc., Gyeonggi-do (KR)

( * ) Notice: Subject to any disclaimer, the term of this patent is extended or adjusted under 35 U.S.C. 154(b) by 853 days.

(21) Appl. No.: 13/277,792

(22) Filed: Oct. 20, 2011

(65) Prior Publication Data

US 2012/0261987 A1 Oct. 18, 2012

(30) Foreign Application Priority Data

Apr. 15, 2011 (KR) .................. 10-2011-0035090

(51) Int. Cl.
*H02J 9/00* (2006.01)

(52) U.S. Cl.
CPC ...................... *H02J 9/005* (2013.01)

(58) Field of Classification Search
CPC .............................................. H02J 9/005
USPC ........................................ 307/147, 149, 43
See application file for complete search history.

(56) References Cited

FOREIGN PATENT DOCUMENTS

KR    1019920003008    4/1992

OTHER PUBLICATIONS

Office Action issued by the Korean Intellectual Property Office on Jul. 19, 2012.

*Primary Examiner* — Daniel Cavallari
(74) *Attorney, Agent, or Firm* — IP & T Group LLP

(57) ABSTRACT

An internal voltage generation circuit includes a plurality of active driving units configured to supply a plurality of active power supply voltages to a plurality of voltage terminals, respectively, in an active mode, and a common standby driving unit configured to commonly supply a standby power supply voltage to the plurality of voltage terminals in a standby mode.

14 Claims, 2 Drawing Sheets

1

INTERNAL VOLTAGE GENERATOR AND OPERATION METHOD THEREOF

CROSS-REFERENCE TO RELATED APPLICATIONS

The present application claims priority of Korean Patent Application No. 10-2011-0035090, filed on Apr. 15, 2011, which is incorporated herein by reference in its entirety.

BACKGROUND

1. Field

Exemplary embodiments of the present invention relate to a semiconductor design technology, and more particularly, to an internal voltage generation circuit which operates in a standby mode and an active mode.

2. Description of the Related Art

Semiconductor devices generally are provided with power by an external power supply voltage. The semiconductor devices generate an internal power supply voltage based on the external power supply voltage. For this reason, a semiconductor device includes an internal voltage generation circuit for generating an internal power supply voltage. The semiconductor device may include a plurality of internal voltage generation circuits. Each of the internal voltage generation circuits may supply the intern power supply voltage to the corresponding region of the semiconductor device.

Meanwhile, a semiconductor device operates in a standby mode and an active mode. Here, the standby mode means an operation mode where the semiconductor device prepares to enter the active mode in response to an active command while using a minimum amount of power. The active mode means an operation mode where the semiconductor device performs a read operation or a write operation.

FIG. 1 is a block diagram illustrating a conventional internal voltage generation circuit.

Referring to FIG. 1, the internal voltage generation circuit includes a peripheral power supply voltage generation unit 110 and a main power supply voltage generation unit 120.

The peripheral power supply voltage generation unit 110 supplies a power supply voltage VPERI1 or VPERI2 to a circuit disposed in a peripheral region and the peripheral power supply voltage generation unit 110 includes a peripheral standby driver 111 and a peripheral active driver 112 responding to mode control signals MD_STB and MD_ACT.

The main power supply voltage generation unit 120 supplies a power supply voltage VMAIN1 or VMAIN2 to a circuit disposed in a main region and the main power supply voltage generation unit 120 includes a main standby driver 121 and a main active driver 122 responding to the mode control signals MD_STB and MD_ACT. Here, the peripheral power supply voltage generation unit 110 and the main power supply voltage generation unit 120 are disposed separately, and the peripheral power supply voltage generation unit 110 drive a peripheral power supply voltage terminal V_PRI in a standby mode and an active mode, whereas the main power supply voltage generation unit 120 drives a main power source voltage terminal V_MN.

As described above, since the internal voltage generation circuit has an independent structure, that is, respective voltage generation units for the voltage supply terminals, the internal voltage generation circuit may prevent a power drop from occurring in the active mode. Even if a power supply voltage drop may occurs, the internal voltage generation circuit may be easy to make the power supply voltage rebound back to a target voltage. However, since the internal voltage generation circuit has the independent structure, the independent structure may increase the amount of standby current by excessively supplying a power supply voltage in the standby mode.

SUMMARY

Exemplary embodiments of the present invention are directed to an internal voltage generation circuit that may minimize the amount of standby current consumed in a standby mode.

In accordance with an exemplary embodiment of the present invention, an internal voltage generation circuit includes a plurality of active driving units configured to supply a plurality of active power supply voltages to a plurality of voltage terminals, respectively, in an active mode; and a common standby driving unit configured to commonly supply a standby power supply voltage to the plurality of voltage terminals in a standby mode.

In accordance with another exemplary embodiment of the present invention, an internal voltage generation circuit includes: a first power supply voltage generation unit configured to supply a standby power supply voltage and a first active power supply voltage to a first voltage terminal in response to a standby mode signal and an active mode signal, respectively; a second power supply voltage generation unit configured to supply a second active power supply voltage to a second voltage terminal in response to the active mode signal; and a power supply voltage transferring unit configured to transfer the standby power supply voltage to the second voltage terminal in response to the standby mode signal.

In accordance with yet another exemplary embodiment of the present invention, a method for driving an internal voltage generation circuit includes: supplying a plurality of active power supply voltages to a plurality of power supply voltage terminals in an active mode, respectively; and commonly supplying a standby power supply voltage to the power supply voltage terminals in a standby mode by electrically connecting the power supply voltage terminals to each other.

DETAILED DESCRIPTION

Figure 1:
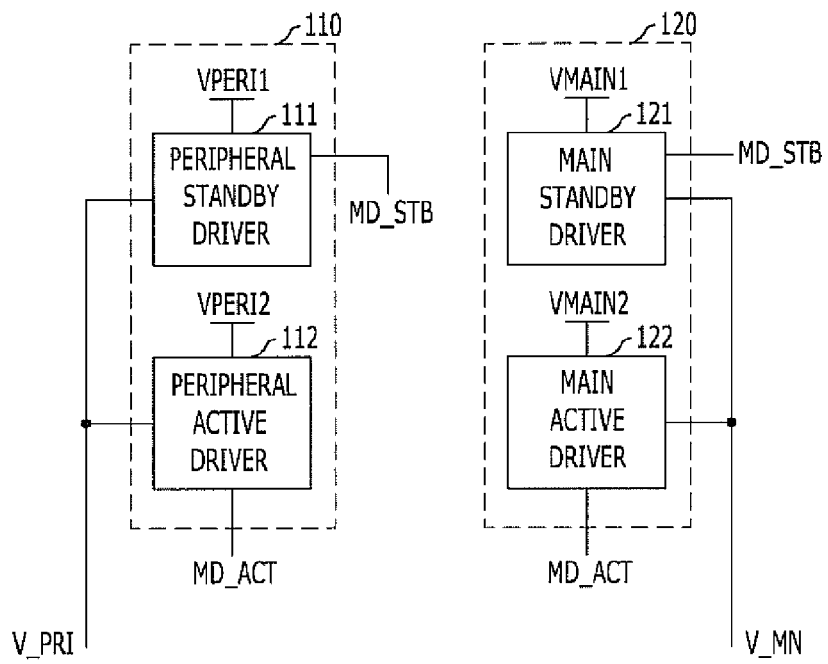
FIG. 1 is a block diagram illustrating a conventional internal voltage generation circuit.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

Figure 2:
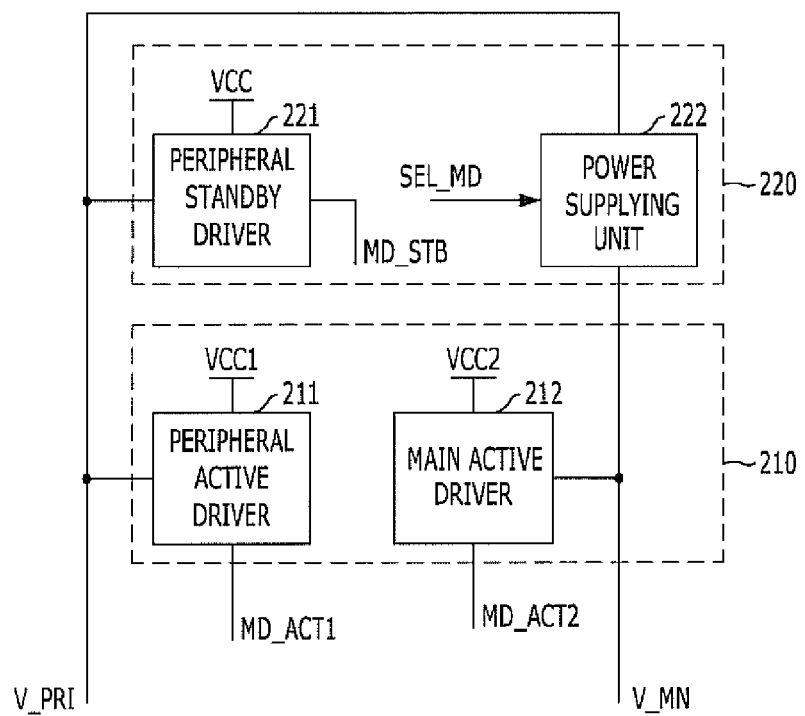
FIG. 2 is a block diagram illustrating an internal voltage generation circuit in accordance with an exemplary embodiment of the present invention.

FIG. 2 is a block diagram illustrating an internal voltage generation circuit in accordance with an exemplary embodiment of the present invention.

Referring to FIG. 2, the internal voltage generation circuit includes an active driving unit 210 and a common standby driving unit 220. The internal voltage generation circuit may include a plurality of active driving units.

The active driving unit 210 supply an active power supply voltage to a corresponding region in an active mode, and the active driving unit 210 include a peripheral active driver 211 and a main active driver 212. Here, the peripheral active driver 211 supplies a peripheral active power supply voltage VCC1 to a circuit disposed in a peripheral region in an active mode, and the main active driver 212 supplies a main active power supply voltage VCC2 to a circuit disposed in a main region in an active mode. Here, the peripheral active power supply voltage and the main active power supply voltage may have different target levels. The peripheral active driver 211 and the main active driver 212 receive a first active mode control signal MD_ACT1 and a second active mode control signal MD_ACT2, which are signals for controlling the peripheral active driver 211 and the main active driver 212 to enter an active mode.

Subsequently, the common standby driving unit 220 supplies a standby power supply voltage VCC in common to the regions, where the active driving unit 210 supply the active power supply voltages, in a standby mode. In other words, the common standby driving unit 220 supplies a standby voltage of the same voltage level to the circuits disposed in the peripheral region and the main region during the standby mode. Here, although the common standby driving unit 220 is described, for example, to operate in the standby mode, the common standby driving unit 220 may be designed to operate in the standby mode and the active mode as well. The common standby driving unit 220 receives a standby mode control signal MD_STB, and the standby mode control signal MD_STB is a signal for controlling the common standby driving unit 220 to enter the standby mode.

Hereafter, a simple circuit operation is described.

First, the common standby driving unit 220 operates in the standby mode. Therefore, the standby power supply voltage of the same voltage level is applied to a peripheral power supply voltage terminal V_PRI and a main power supply voltage terminal V_MN. Meanwhile, in the active mode, the peripheral active driver 211 and the main active driver 212 operate, and a peripheral active power supply voltage VCC1 is applied to the peripheral power supply voltage terminal V_PRI, and a main active power supply voltage VCC2 is applied to the main power supply voltage terminal V_MN. The peripheral active driver 211 and the main active driver 212 may go into the active mode at different moments, and each of the active mode entering moments may be controlled in response to the first active mode control signal MD_ACT1 and the second active mode control signal MD_ACT2.

The internal voltage generation circuit fabricated in accordance with the exemplary embodiment of the present invention includes a common driving unit operating in the standby mode while including multiple driving units operating in the active mode. In other words, the internal voltage generation circuit includes one common standby driving unit 220 corresponding to the peripheral active driver 211 and the main active driver 212. Therefore, in the active mode, since the peripheral active driver 211 and the main active driver 212 drive the peripheral power supply voltage terminal V_PRI and the main power supply voltage terminal V_MN, respectively, the occurrence of a power drop may be prevented and even if a power supply voltage drop may occurs, the active voltage may easily rebound back to the desired target voltage level. Subsequently, since the common standby driving unit 220 drives the peripheral power supply voltage terminal V_PRI and the main power supply voltage terminal V_MN in the standby mode, the standby current may be minimized. Also, since the internal voltage generation circuit includes the common standby driving unit 220, the internal voltage generation circuit may be deposited on a smaller area compared with conventional internal voltage generation circuits.

The common standby driving unit 220 includes a peripheral standby driver 221 and a power supplying unit 222. The peripheral standby driver 221 supplies a standby power supply voltage to a peripheral power supply voltage terminal V_PRI in the standby mode. The power supplying unit 222 transfers the standby power supply voltage VCC which is supplied to the peripheral power source voltage terminal V_PRI to the main power supply voltage terminal V_MN.

Here, the peripheral standby driver 221 and the power supplying unit 222 may be designed in diverse ways.

Figure 3:
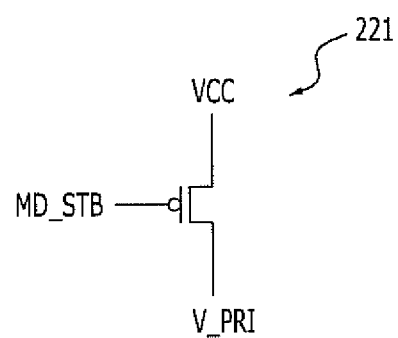
FIGS. 3 and 4 are schematic diagrams respectively illustrating a peripheral standby driver and a power supplying unit shown in FIG. 2.
Figure 4:
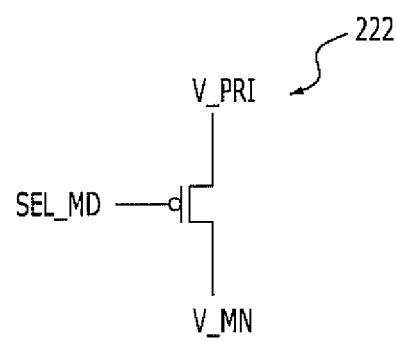

FIGS. 3 and 4 are schematic diagrams respectively illustrating the peripheral standby driver 221 and the power supplying unit 222 shown in FIG. 2.

The peripheral standby driver 221 may include a MOS transistor which is disposed between a standby power supply voltage (VCC) terminal and the peripheral power supply voltage terminal V_PRI and couples the two voltage terminals in response to the standby mode control signal MD_STB.

The power supplying unit 222 may include a MOS transistor which is disposed between the peripheral power supply voltage terminal V_PRI and the main power supply voltage terminal V_MN and couples the two voltage terminals in response to a mode selection signal SEL_MD for the standby mode.

Hereafter, a detailed operation of the circuit including the peripheral standby driver 221 and the power supplying unit 222 is described.

First, the peripheral standby driver 221 operates in the standby mode. Here, the power supplying unit 222 couples the peripheral power supply voltage terminal V_PRI with the main power supply voltage terminal V_MN in response to the mode selection signal SEL_MD. Thus, the peripheral standby driver 221 supplies the standby power supply voltage VCC to the peripheral power supply voltage terminal V_PRI and the main power supply voltage terminal V_MN.

Subsequently, the peripheral active driver 211 and the main active driving unit 212 operate in the active mode. Thus, the peripheral active driver 211 supplies the peripheral active power supply voltage VCC1 to the peripheral power supply voltage terminal V_PRI, and the main active driving unit 212 supplies the main active power supply voltage VCC2 to the main power source voltage terminal V_MN. Here, since the power supplying unit 222 separates the peripheral power supply voltage terminal V_PRI from the main power supply voltage terminal V_MN in response to the mode selection signal SEL_MD, the peripheral active power supply voltage VCC1 supplied to the peripheral power supply voltage terminal V_PRI is not transferred to the main power supply voltage terminal V_MN.

For example, when a conventional internal voltage generation circuit produces a standby current of approximately 14.24 μA experimentally, the internal voltage generation circuit according to the embodiment of the present invention may produce a standby current of approximately 8.9 μA, thereby obtaining a current gain of approximately 5.34 μA.

According to an embodiment of the present invention, an internal voltage generation circuit not only performs a stable operation in an active mode but also minimizes the amount of current consumed in a standby mode.

While the present invention has been described with respect to the specific embodiments, it will be apparent to those skilled in the art that various changes and modifications may be made without departing from the spirit and scope of the invention as defined in the following claims.

What is claimed is:

1. An internal voltage generation circuit, comprising:
    a plurality of active driving units configured to supply a plurality of active power supply voltages to a plurality of voltage terminals, respectively, in an active mode; and
    a common standby driving unit configured to commonly supply a standby power supply voltage to the plurality of voltage terminals in a standby mode.

2. The internal voltage generation circuit of claim 1, wherein the active driving units are configured to supply the respective active power supply voltages to different regions of a system having the internal voltage generation circuit through the plurality of voltage terminals, respectively.

3. The internal voltage generation circuit of claim 2, wherein the common standby driving unit is configured to supply the standby power supply voltage to the different regions in common through the plurality of voltage terminals.

4. The internal voltage generation circuit of claim 1, wherein the common standby driving unit is configured to operate in the standby mode and the active mode.

5. The internal voltage generation circuit of claim 1, wherein the active power supply voltages have different target voltage levels.

6. The internal voltage generation circuit of claim 1, wherein the active driving units are configured to enter the active mode at different moments.

7. An internal voltage generation circuit, comprising:
    a first power supply voltage generation unit configured to supply a standby power supply voltage and a first active power supply voltage to a first voltage terminal in response to a standby mode signal and an active mode signal, respectively;
    a second power supply voltage generation unit configured to supply a second active power supply voltage to a second voltage terminal in response to the active mode signal; and
    a power supply voltage transferring unit configured to transfer the standby power supply voltage to the second voltage terminal in response to the standby mode signal.

8. The internal voltage generation circuit of claim 7, wherein the first power supply voltage generation unit comprises:
    a standby driver configured to supply the standby power supply voltage to the first voltage terminal in response to the standby mode signal; and
    an active driver configured to supply the first active power supply voltage to the first voltage terminal in response to the active mode signal.

9. The internal voltage generation circuit of claim 7, wherein the standby mode signal and the active mode signal are activated in standby and active modes, respectively.

10. The internal voltage generation circuit of claim 9, wherein the power supply voltage transferring unit is configured to prevent the first active power supply voltage from being transferred to the second voltage terminal in the active mode.

11. The internal voltage generation circuit of claim 7, wherein the first active power supply voltage and the second active power supply voltage have different target voltage levels.

12. The internal voltage generation circuit of claim 9, wherein the first power supply voltage generation unit and the second power supply voltage generation unit are configured to enter the active mode at different moments.

13. A method for driving an internal voltage generation circuit, comprising:
    supplying a plurality of active power supply voltages to a plurality of power supply voltage terminals in an active mode, respectively; and
    commonly supplying a standby power supply voltage to the power supply voltage terminals in a standby mode by electrically connecting the power supply voltage terminals to each other.

14. The method of claim 13, wherein, the power supply voltage terminals comprise a peripheral power supply voltage terminal and a main power supply voltage terminal.

* * * * *